(12) United States Patent
Dutta et al.

(10) Patent No.: US 9,025,771 B2
(45) Date of Patent: May 5, 2015

(54) SECURITY OPTIMIZATION FOR IMS/MMD ARCHITECTURE

(75) Inventors: Ashutosh Dutta, Bridgewater, NJ (US); Abhrajit Ghosh, Edison, NJ (US); Subir Das, Kendall Park, NJ (US); Fuchun Joesph Lin, Morris Plains, NJ (US); Kyriakos Manousakis, New Brunswick, NJ (US); Dana Chee, Maplewood, NJ (US); Tsunehiko Chiba, Saitama (JP); Hidetoshi Yokota, Minuma (JP); Akira Idoue, Toda (JP)

(73) Assignee: Telcordia Technologies, Inc., Piscataway, NJ (US)

( * ) Notice: Subject to any disclaimer, the term of this patent is extended or adjusted under 35 U.S.C. 154(b) by 1341 days.

(21) Appl. No.: 11/900,619

(22) Filed: Sep. 11, 2007

(65) Prior Publication Data

US 2008/0072310 A1 Mar. 20, 2008

Related U.S. Application Data

(60) Provisional application No. 60/843,641, filed on Sep. 11, 2006.

(51) Int. Cl.
*H04K 1/00* (2006.01)
*H04W 36/00* (2009.01)
*H04L 29/06* (2006.01)

(52) U.S. Cl.
CPC ....... *H04W 36/0038* (2013.01); *H04L 65/1016* (2013.01)

(58) Field of Classification Search
USPC ....................................... 380/270
See application file for complete search history.

(56) References Cited

U.S. PATENT DOCUMENTS

| 2004/0117657 A1* | 6/2004 | Gabor et al. ............ 713/201 |
| 2006/0078120 A1* | 4/2006 | Mahendran et al. ....... 380/255 |
| 2006/0083201 A1* | 4/2006 | He et al. .................. 370/331 |
| 2006/0099929 A1  | 5/2006 | Frank et al. |

(Continued)

FOREIGN PATENT DOCUMENTS

| EP | 1605723 A2 | 12/2005 | |
| WO | WO 2007082752 | * 7/2012 | ........ H04L 29/06 |

OTHER PUBLICATIONS

Loughney, et al. "Context Transfer Protocol (CXTP)" The Internet Society, Network Working Group, Request for Comments: 4067, Jul. 2005, ftp://ftp.rfc-editor.org/in-notes/rfc4067.txt.

(Continued)

*Primary Examiner* — Christopher Brown

(57) ABSTRACT

A mechanism by which handoff delay can be minimized while not compromising the IMS/MMD security and also protecting the media if required by certain applications is presented. Methods for mitigating delay during SA re-association and mitigating the IPSec tunnel overhead for signaling and media at the Mobile Node are given. In one embodiment, SA keys can be transferred from the old P-CSCF to new P-CSCF, enabling the establishment of SAs before Mobile Node physically moves to the new subnet in a network. Proactive handover is used. In another embodiment, SA keys are transferred from S-CSCF to new P-CSCF. In this case, the SA keys are transferred to the new P-CSCF by S-CSCF through a context transfer mechanism well in advance so that SAs may be established before Mobile Node physically moves to new subnet. In another embodiment, methods for mitigating IPSec tunnel overhead are presented.

6 Claims, 12 Drawing Sheets

(56) References Cited

U.S. PATENT DOCUMENTS

| | | | |
|---|---|---|---|
| 2006/0120287 A1 | 6/2006 | Foti et al. | |
| 2006/0146752 A1* | 7/2006 | Jang et al. | 370/331 |
| 2007/0064647 A1* | 3/2007 | Prasad | 370/331 |
| 2007/0147298 A1* | 6/2007 | Miao et al. | 370/331 |
| 2007/0207805 A1* | 9/2007 | Pallares Lopez et al. | 455/436 |
| 2009/0037999 A1* | 2/2009 | Anderson et al. | 726/12 |

OTHER PUBLICATIONS

International Search Report, dated Apr. 4, 2008.

"Third Generation Partnership Project: Access Security for IP-based Services", 3GPP TS 33.203 V7.0.0, Dec. 2005.

"Third Generation Partnership Project: IMS Security Framework", Dec. 2005.

W. Diffie, M.E. Hellman, "New Directions in Cryptography", IEEE Transactions on Information Theory 22, Nov. 6, 1979, pp. 644-654.

Leggio, S., et al., "Achieving seamless mobility in IP-based radio access networks," IEEE Wireless Communications, IEEE Service Center, Piscataway, NJ, US, Feb. 1, 2005.

Kim Lynggaard Larsen, et al., "Optimized Macro Mobility within the 3GPP IP Multimedia Subsystem," Computing in the Global Information Technology, 2006. ICCGI 2006. International Multi-Conference on Bucharest, Romania Aug. 1-3, 2006, Piscataway, NJ, USA Jul. 1, 2006.

3GPP TS 33.203 v. 7.3.0, Release 7, Digital cellular telecommunications system (Phase 2+); Universal Mobile Telecommunications Systems (UMTS); 3G security; Access security for IP-based services; ETSI TS 133 203; ETSI Standards, LIS, Sophia Antipolis Cedex, France Sep. 1, 2006.

* cited by examiner

SECURITY OPTIMIZATION FOR IMS/MMD ARCHITECTURE

CROSS REFERENCE TO RELATED APPLICATION

The present invention claims the benefit of U.S. provisional patent application 60/843,641 filed Sep. 11, 2006, the entire contents and disclosure of which are incorporated herein by reference.

FIELD OF THE INVENTION

The present invention relates generally to IMS/MMD architecture, and more specifically to security optimization in IMS/MMD networks.

BACKGROUND OF THE INVENTION

An IMS/MMD (Multimedia Domain) network or architecture primarily consists of several signaling entities such as proxy-call session control function (P-CSCF), interrogating-CSCF (I-CSCF), serving-CSCF (S-CSCF), and home subscriber service (HSS) which is usually a database or other repository for user or subscriber information such as authorization data, including information related to services provided to a user. Roaming service and mobility are supported by a combination of Session Initiation Protocol (SIP) components such as the signaling entities, P-CSCF, S-CSCF, I-CSCF, and mobile IP components or nodes, such as home agent (HA) and foreign agent (FA). IMS/MMD architecture mandates that there should be security association (SA) between the mobile and P-CSCF. Secure Internet Protocol (IPSec) is one way of providing SA for signaling and media traffic.

In the MMD, service is not provided until an SA is established between the user equipment (UE) and the network. Typically, UE is a Mobile Node (MN). IMS is essentially an overlay to the packet data subsystem (PDS) and has a low dependency on the PDS as it can be deployed without the multimedia session capability. Consequently, a separate SA is required between the multimedia client and the IMS before access is granted to multimedia services.

The primary focus of the IMS/MMD security architecture is the protection of SIP signaling between the subscriber and the IMS. The IMS defines a means of mutual authentication between the subscriber and the IMS, and also specifies mechanisms for securing inter- and intra-domain communication between IMS network elements.

A high level overview of the IMS/MMD security architecture, with numeric labels assigned to security interfaces between the various elements, is shown in FIG. 1. Security interface 1, IMS authentication and key agreement (AKA), is used for authentication between the UE and the HSS in the Home Network. AKA is discussed in more detail below. Security interface 2, IPSec, is used to secure SIP messaging between the UE and the first-hop P-CSCF. Security between the IMS core network elements is shown as security interfaces 3, 4 and 5. Security interfaces 6 and 7 are between IMS core network elements and external IP-Networks. IPSec is applicable both when communication is within the same security domain, and across security domains. The role of IPSec in IMS/MMD is discussed in more detail below.

The current IMS/MMD security architecture addresses the threat of masquerading, whereby an attacker could get unauthorized access to services by pretending to be either a network element or an authorized user. The incorporation of subscriber authentication via authentication and key agreement (AKA) and IPSec, and network node authentication using IPSec prevents this from happening. Also addressed is the issue of eavesdropping, whereby an attacker could compromise the confidentiality of signaling messages or perform passive traffic analysis on these messages. IPSec based encryption may be applied to address this category of threats.

The security architecture shown in FIG. 1 essentially enables Home Network-based authorization for access to IMS services. Although the Visited Network controls the bearer resources used by the UE, IMS authorization can only be obtained from the S-CSCF in the Home Network.

IPSec is a suite of security protocols that has been designed to ensure security of IP layer traffic. The IPSec Encapsulating Security Payload (ESP) protocol supports confidentiality and integrity protection of IP packet payloads, while the IPSec authentication header (AH) protocol supports integrity protection of entire IP packets. The ESP and AH protocol services are provided by establishing security associations (SA) between IPSec enabled network nodes. An SA defines, among other parameters, the integrity protection and encryption algorithms in use between a pair of nodes, and the symmetric keys used by these algorithms. IPSec also defines a key negotiation protocol, IKE, that is used to securely establish the symmetric keys used by ESP or AH SAs.

IPSec ESP and AH protocols may operate in either tunnel or transport mode. In tunnel mode, the entire IP packet is encapsulated within a new IP packet, while in transport mode, additions or modifications are made to the IP payload. Per packet overhead is somewhat higher in tunnel mode in part because it is primarily intended to prevent traffic analysis when used on IPSec gateways that are located between communicating nodes.

IPSec protocols are used extensively in the Internet. The protocol suite is modular in the sense that new confidentiality and integrity protection algorithms can be incorporated without changes to the system architecture. IPSec traffic can be carried on existing IP infrastructure without modification to the underlying physical layer or the interconnection topology. IPSec operation is typically transparent to application layer entities. In the IMS/MMD framework, IPSec is primarily used to provide confidentiality and integrity protection to SIP messages exchanged between the UE and the P-CSCF (security interface 2 in FIG. 1). IPSec ESP, operating in transport mode, is mandated for use in this context. Accordingly, IPSec ESP transport mode SAs are established between a UE and its corresponding P-CSCF once the UE and the P-CSCF have successfully mutually authenticated each other. The IPSec SA establishment procedure is undertaken by IMS AKA.

The following is a list of characteristics of IPSec operating between the P-CSCF and the UE:

IPSec ESP processing is transparent to the SIP applications at the P-CSCF and UE, and is carried out by IPSec modules. These IPSec modules operate outside the scope of the SIP application, although SIP applications may configure SAs within the IPSec modules.

IPSec provides data authentication for the SIP messages; an IPSec ESP protected message received at the UE is guaranteed to have been generated by the P-CSCF (assuming the P-CSCF and UE have not been compromised) and vice versa. Further, the message is guaranteed to not have been replayed by an adversary.

IPSec also provides data confidentiality to SIP messages. Assuming uncompromised P-CSCF and UE, IPSec will provide confidentiality to messages generated between them; no eavesdropper will be able to decipher any captured packets.

Since IPSec ESP does not protect the integrity of IP headers, it is necessary for the receiving SIP application to verify that the contact via headers of protected SIP messages match the source IP address in the packet header.

IPSec may also be employed for security between IMS core network elements interacting either within a single operator's domain (Intra-domain) or across two or more operator's domains (Inter-domain). This leaves the manner of IPSec use at the discretion of the concerned operator(s). Providing inter-domain security involves securing SIP messaging between I-CSCF & P-CSCF (security interface 4 in FIG. 1), between S-CSCF & P-CSCF (security interface 4 in FIG. 1) and between S-CSCF & external IP networks housing SIP application servers (security interface 7 in FIG. 1). In addition, it also involves securing messaging between external SIP application servers and the HSS (Cx-interface) (security interface 6 in FIG. 1). In all cases, IMS Security standards in accordance with 3GPP2 mandates the use of IPSec, in either transport or tunnel mode, using integrity protection as well as encryption. Further, IMS Security standards also require the use of IKE for negotiating security associations between such nodes. IPSec based inter-domain security has the following characteristics:

Use of IKE allows secure negotiation of shared keys between communicating nodes. No predeployment of keys, as required by IMS AKA, is needed.

IKE uses public keys for computation of shared keys using a Diffie-Hellman exchange. Since Diffie-Helman exchanges are vulnerable to man-in-the-middle attacks, the use of public key certificates would be essential to guarantee authenticity of keys.

Use of tunnel mode security associations across operator networks allows the use of security gateways between operator networks.

This allows protection of operator networks from traffic analysis attacks, since tunnel mode SAs encrypt IP headers of packets generated at IMS nodes.

Intra domain security (security interfaces 3 & 5 in FIG. 1) is left open to the administrative authority for the domain. IPSec based confidentiality and integrity protection is an option, although no particular key distribution/negotiation mechanism or SA mode is mandated.

One IPSec transport mode ESP is IMS AKA which is an authentication protocol defined for use between the UE and the HSS. IMS AKA is based on the SIP security mechanism agreement protocol. In this protocol, all security parameters are exchanged between the UE and the HSS using SIP.

FIG. 2 shows the constituent SIP message flows, involving the UE, P-CSCF, I-CSCF, S-CSCF & HSS, of IMS AKA. IMS AKA is piggybacked on top of SIP registration/response messages along with the associated key distribution process. Two sets of Registration/Response messages are required. At the end of the first set of messages, IPSec SAs are established between the UE and the P-CSCF. The UE authenticates the network after receiving the 4xx Auth_Challenege message while the network authenticates the UE after receiving the second Register message.

The following are characteristics of IMS/AKA:

Authentication is achieved between the UE and its Home Network even though the SIP messaging is transported over the Serving (Visited) Network.

This allows Home Network-based control of access to IMS resources, while the Visited Network has control of bearer resources over the packet data subsystem (PDS).

SIP Registration/Response messages are used to transport the IMS/AKA protocol payloads. These messages are sent from the UE to the S-CSCF and vice versa. The S-CSCF queries the HSS to obtain security related parameters for the UE.

The UE and the HSS share a long term key (K). This key is only used during the IMS/AKA protocol operation and not during IPSec processing at the UE.

IMS AKA uses a challenge response mechanism to authenticate the UE to the Home Network. The UE uses K to compute a response to a challenge sent by the S-CSCF via the P-CSCF. The P-CSCF plays no role in challenge generation aside from acting as a forwarding element.

The Network is authenticated to the UE by verification of a message authentication code (MAC) sent by the S-CSCF via the P-CSCF. The MAC, at layer 2 link, or L2, is verified using K at the UE.

IPSec ESP SAs between the UE and its current P-CSCF are established during the IMS AKA based Registration process. The HSS uses K to derive the integrity key (IK) and encryption key (CK) for use in an IPSec SA. A fresh IK, CK pair is used to setup new IPSec SAs whenever a new IMS AKA procedure occurs between the UE and its current P-CSCF.

IK, CK pairs are transported to the visited P-CSCF during the course of the IMS AKA procedure using a SIP response message from the Home Network's S-CSCF. K is never sent to the P-CSCF. Thus, even IK, CK are compromised for a particular SA, K will not be compromised.

The IPSec SAs always have a lifetime that is slightly greater than the SIP Registration lifetime. This allows new SIP Registrations to make use of preexisting SAs whenever possible.

SIP packets exchanged between the UE and the P-CSCF are protected using pairs of unidirectional ESP transport mode SAs. Thus, the UE has an inbound SA for packets received from the P-CSCF and an outbound SA for packets sent to the P-CSCF. The P-CSCF also has a similar pair of SAs for each UE with which it communicates. These SAs are established between the UE and the P-CSCF using the IMS AKA protocol as discussed above.

Transport mode operation of IPSec ESP for IPv4, shown in FIG. 3, includes the operation of IPSec ESP for the case of a transmission control protocol (TCP) payload. The operation for user datagram protocol (UDP) payloads is identical, except that the UDP protocol number replaces the TCP protocol number in the packets. SIP messaging may be carried over either UDP or TCP. Hence, the SIP headers and payload would be carried in the Data portion of the packet shown in FIG. 3.

Once SAs are established, every SIP packet sent from the UE to the P-CSCF is processed by IPSec, as follows:

1. Assuming a UDP transport, the SIP packet generated at the UE is encapsulated within a UDP payload that, in turn, is framed within an IP payload. This IP packet is processed by the outbound SA at the UE.

2. An ESP trailer containing pad bytes and payload information is appended to the IP payload that contains the SIP datagram. The IP payload and the ESP Trailer are then encrypted using one of the algorithms mandated by IMS/MMD. The algorithms mandated at present are DES-EDE3-CBC and AES-CBC.

3. An ESP header containing SA specific information is inserted between the IP payload and the original IP header.

4. The new IP payload, from the ESP header to the ESP trailer, is integrity protected by one of the IMS/MMD mandated algorithms. These are HMAC-MD5-96 or HMAC- SHA-1-96 at present. The integrity protection information is stored in the ESP Authentication field that is appended at the end of the IP datagram.

5. The IP datagram with the newly added ESP fields is now transmitted to the P-CSCF over the PDS layer.

6. On receiving the IP datagram, the P-CSCF determines which inbound SA to use by consulting the ESP header and the IP header's destination IP address.

7. First, the P-CSCF checks the packet integrity by using the ESP authentication header field and the integrity protection key specified by the selected SA.

8. Once integrity is verified, the P-CSCF uses the decryption key specified by the SA to decrypt the IP payload. Once decryption is completed, the ESP related headers are removed and the packet is eventually transferred over to the SIP application.

SIP packets transmitted from the P-CSCF to the UE are also processed in a similar manner using the corresponding outbound SA at the P-CSCF and the inbound SA at the UE.

The P-CSCF forwards received SIP packets from the UE to other IMS network elements and vice versa. SIP signaling packets thus need to be protected as they transit or travel within the IMS core network. IMS Security standards specify IPSec as a means to achieve inter-domain security for signaling messages exchanged between inter-domain network elements. In the case where IPSec is not available, IMS Security standards also suggest the use of transport layer security (TLS) as a means to achieve hop-by-hop security between network elements. In cases where the IMS network elements are within the same network operator's domain, IMS Security standards leave the security mechanisms to the discretion of the network operator.

The IMS/MMD security framework does not specify a means to secure media at the IMS layer but instead focuses on securing SIP based signaling messages. Media sessions do not flow through the IMS core network elements such as the P-CSCF, I-CSCF and S-CSCF and are thus outside the scope. IP multimedia sessions will traverse the PDS in the form of user data packets. Some security is provided to data packets at the Radio Access (RA) level and the IP network level as shown in FIG. 4.

RA level security may incorporate air interface encryption at the discretion of the network provider, to support confidentiality requirements. However, this does not provide end-to-end security to the media.

IPSec may be supported between the Home Agent and Foreign Agent at the discretion of the network operator(s). Again, this does not provide end-to-end security.

End-to-end security may be added in accordance with user requirements but the mechanisms for these are not, at present, specified in the 3GPP2 standards. End-to-end security may be required based on the level of confidence the user has in the network security mechanisms or on the nature of the media content. However, in some situations, end-to-end security may interfere with government regulations requiring Lawfully Authorized Electronic Surveillance.

Alternative mechanisms are available for performing end-to-end security.

IPSec: Network layer end-to-end security may be provided by leveraging IPSec services already present at the UE. In this case, SAs would be established directly between UEs, and no support would be required from the PDS. Applications generating media content at the UEs would not be impacted by the introduction of IPSec and the media streaming protocol would be unaware of the presence of IPSec as well.

SRTP: The Secure Real-time Transport Protocol is a profile of the Real-time Transport Protocol (RTP), which can provide confidentiality, message authentication, and replay protection to the RTP traffic and to the control traffic for RTP. As with the case of IPSec, no PDS support would be required. However, applications generating media content would need to support SRTP.

IPSec impacts different architecture alternatives in terms of P-CSCF placement. One alternative has P-CSCF in the home network core. For this alternative, we examine two distinct cases for two mobility protocols: i) when MIPv6 is used, and ii) when MIPv4 is used in FA mode. FIG. 5 illustrates the scenario where MIPv6 is deployed. In such a scenario, two tunnels are required from the mobile node (MN): one is an MIPv6 tunnel between MN and HA, and the other one is a tunnel between MN and P-CSCF. Mobile Node requires an IPSec SA be established with the home P-CSCF whether it is bootstrapping or changing a P-CSCF while roaming. Also, depending upon how the SAs are created, Mobile Node may require establishing a new SA with the same P-CSCF when Mobile Node changes to a new PDSN. Therefore, more tunnel overhead is added at the Mobile Node, in addition to MIPv6 tunnel.

Depending upon the location of Mobile Node and access network conditions, IPSec SAs establishment may have some impact on handoff performance. All SIP signaling including registration does need to be exchanged via IPSec SAs since P-CSCF is in the critical path. Also, IPSec SA establishment needs to be fast enough so that the session can be maintained while MN is connecting to a new PDSN. However, media is not necessarily exchanged via IPSec Sas.

There are some issues during handoff. For example, IPSec SA establishment delay may be high when Mobile Node is visiting a remote network. This may not be an issue during bootstrapping but may affect the handoff performance if this delay is too long or large. A new SA must be established while changing PDSNs. Usually, IPSec SAs are bound to interface IP address. Therefore, when interface IP address changes, i.e. Mobile Node attaches to another PDSN, a new IPSec SA needs to be established, unless SA is bound to some permanent identifier. Further, P-CSCF changes during handoff. In the scenario where visited networks are assigned with different P-CSCFs, Mobile Node needs to create a new IPSec SA while changing the network. However, this may not be the usual case.

IPSec may also impact the core network, mostly at the system level, if proper planning is not done during deployment. One such impact is the number of IPSec Tunnels employed. In a large network, there are many communication paths that need to be set up during a service session for signaling exchange, media transmission, and management data exchange with the home network. Without careful planning, the number of IPSec tunnels required may increase as more applications as well as devices are deployed. The system performance may thus be seriously degraded due to the opening of an excessive number of IPSec tunnels in the core network.

IPSec may also impact the core network with respect to Packet Fragmentation. When IPSec is applied to a data packet at IP Layer 3, a header or trailer or both needs to be added to the packet to let the receiving end know that IPSec algorithms need to be invoked. These additions increase the length of the packet and cause the packet to be split into two packets (known as IP fragmentation) for transmission. For example, if the original packet size is 1,490 bytes, it will increase to 1,544 bytes after adding ESP headers, trailers information, and MAC value. The packet thus needs to be fragmented into two packets when Ethernet is used. These additional packets impose additional processing burden on the system and thus downgrade the overall performance of the network. This may add substantial delay if a large number of requests come from multiple Mobile Nodes simultaneously.

FIG. 6 shows the tunnels that are required in case of MIPv4. The number of tunnels required from the mobile node in such a scenario is only one, e.g., IPSec tunnel between MN and P-CSCF, since the MIP tunnel is between FA and HA. However, fast IPSec SA establishment will be necessary to achieve better handoff performance. Accordingly, this architecture has same type of IPSec issues as described above for MIPv6.

Another alternative architecture in terms of P-CSCF placement is the placing of P-CSCF in the visited network. For this alternative, we also examine two distinct cases for two mobility protocols: i) when MIPv6 is used and ii) when MIPv4 is used in FA mode. FIG. 7 illustrates the scenario where MIPv6 is deployed. In such a scenario, two tunnels are required from the mobile node: one is MIPv6 tunnel between MN and HA and the other one is a tunnel between MN and P-CSCF. Mobile Node requires establishing an IPSec SA with the visited P-CSCF whether it is bootstrapping or changing a P-CSCF while roaming. The only difference with the previous architecture would be that the P-CSCFs are all in the visited domain.

FIG. 8 shows the tunnels that are required in case of MIPv4. As with the above described architecture, only one tunnel is required from the Mobile Node in this scenario, between Mobile Node and P-CSCF. Again, fast IPSec SA establishment will be necessary to achieve better handoff performance.

Yet another alternative architecture in terms of P-CSCF placement is the placing of P-CSCF in the visited network subnets. For this alternative, we again examine two distinct cases for two mobility protocols: i) when MIPv6 is used and ii) when MIPv4 is used in FA mode. FIG. 9 illustrates the scenario where MIPv6 is deployed. As with the above architectures, two tunnels are required from the mobile node: one is an MIPv6 tunnel between MN and HA and the other one is a tunnel between MN and P-CSCF. This architecture has major differences with the previous two architectures in that Mobile Node needs to establish a new IPSec SA each time Mobile Node moves to a new subnet. In other words, each time Mobile Node changes a PDSN, Mobile Node connects to a new P-CSCF. Therefore, IPSec SA establishment delay may be high since Mobile Node has to perform SIP registration with normal AKA procedure each time Mobile Node moves to a new subnet. Hence handoff performance is impacted since media will not start flowing through the new PDSN unless a successful authentication is done, including the establishment of an SA between Mobile Node and P-CSCF.

IPSec may also impact the visited network, mostly at the system level, if proper planning is not done during deployment. For example, in a highly congested visited network, there may be a large number of mobile nodes that need to set up IPSec SAs either during bootstrapping or during a service session handoff. Without careful planning, the number of IPSec tunnels required may increase to a large number as the number of subscribers increases. The system performance may thus be seriously degraded due to the opening of an excessive number of IPSec tunnels in the visited network. Eventually, this may add more delay during SA initialization.

Further, as with the above architecture alternatives, IPSec may also impact the visited network with respect to Packet Fragmentation.

FIG. 10 shows the tunnels that are required in case of MIPv4. The issues with respect to the P-CSCF in the visited network subset in the MIPv4 protocol are the same as those with the visited network, described above. However, there is less impact in terms of tunnel overhead at the Mobile Node since only one tunnel is established, except when accessing from wi-fi networks.

IPSec tunnel establishment delay at the P-CSCF can add significant overhead in both signaling and media on a session transfer during handoff. In particular, some architectures require Mobile Node to register during every subnet change. While signaling for registration and media transfer can happen simultaneously from Mobile Node, media transfer cannot be resumed via new PDSN until SAs are established between P-CSCF and MN. According to IMS/MMD standards, the access control policy in the visited network will only allow the media to flow via new PDSN once the registration is successful in the new visited network, i.e., IPSec SAs are established between MN and new P-CSCF. Thus, an implicit dependency exists between SIP registration and media transfer even though media may not be protected via IPSec SAs. Unfortunately, MIP binding update procedure may also add significant delay to the media depending upon the location of HA.

As discussed above, IMS/MMD security framework defines the security mechanisms between the UE, i.e., Mobile Node, and P-CSCF and is called IMS AKA. The role of IMS AKA in IMS/MMD framework is as follows. During the registration procedure, P-CSCF receives a new pair of keys (e.g., IK and CK) for a Mobile Node from S-CSCF, along with other parameters. These keys are used to establish the SA with the new UE. Although UE may be registered with the same S-CSCF while changing the subnet, ideally the keys generated for new P-CSCF should be different.

Therefore it is evident that the above IMS AKA registration procedure requires time and can add significant delay during P-CSCF handoff. Additionally, multiple tunnels at the Mobile Node may add more overhead to the overall handoff procedure. Thus IPSec optimization is required, that is, a mechanism by which handoff delay can be minimized while not compromising the IMS/MMD security and also protecting the media if required by certain applications.

BRIEF SUMMARY OF THE INVENTION

IPSec optimization has two parts: i) decreasing the time needed for SA re-association, and ii) reducing the IPSec tunnel overhead for signaling and media at Mobile Node. The present invention advantageously provides methods for achieving this optimization, and provides alternative mechanisms that may be used if media security is also required in certain applications.

The following abbreviations are used throughout.
AH: authentication header
AKA: authentication and key agreement
BTS: base transceiver station
ESP: encapsulating security payload
FA: foreign agent
HA: home agent
HSS: home subscriber service
IMS: IP Multimedia Subsystem
IMS/MMD: combination of IMS and MMD
IPSec: suite of security protocols
MAC: message authentication code
MIPv4: Mobile IPv4
MIPv6: Mobile IPv6
MMD: Multimedia Domain
MN: mobile node
PCRF: policy control rules function
P-CSCF: Proxy Call Session Control Function PDG: packet data gateway
PDS: packet data subsystem
PDSN: Packet Data Serving Node
RA: radio access
RTP: real-time transport protocol
SA: security association
S-CSCF: Serving Call Session Control Function
SIP: session initiation protocol
SRTP: secure real-time transport protocol
TCP: transmission control protocol
TLS: transport layer security
UDP: user datagram protocol
UE: user equipment
URI: Universal Resource Identifier

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF THE INVENTION

Security optimization can be achieved by performing some of the steps necessary for establishing a secure connection for a mobile in a new network before the mobile physically moves to the new network. As discussed above, an SA is established between a mobile and the network before any service is provided to the mobile. This SA typically occurs between the mobile and a signaling entity. Hence, a mobile has an "old" or existing security association through an "old" signaling entity. When the mobile moves to a new or different network, a "new" security association is established through a "new" signaling entity. Executing the steps to create the new security association before the move lessens the delay during SA re-association. However, to be able to perform steps prior to the move, it must be determined to which network the mobile will move. In the alternative, delay can be shortened by reducing the number of IP-IP tunnels in the new network.

In order to obtain security optimization and mitigate the delay during SA re-association, one or more of the following approaches can be taken. In one embodiment, illustrated in FIG. 11, SA keys 12 can be transferred from the old P-CSCF 14 to new P-CSCF 20, enabling the establishment of SAs before Mobile Node 10 physically moves to the new subnet. In this embodiment, keys are not changing at the P-CSCF as Mobile Node 10 moves from one subnet to another; instead, the keys are transferred to the new P-CSCF 20 from old P-CSCF 14 through some context transfer mechanism.

Proactive handover can be used to predict the new destination, as is known. The mobile can discover the target network and the associated network elements by any means known or discovered by one skilled in the art. Once the prediction is made, keys become available, and new P-CSCF 20 will create the SAs while performing the normal SIP registration in parallel. Several mechanisms can be used to transfer the keys and other call state parameters to the new P-CSCF 20. For example, IETF CXTP, SIP methods such as MESSAGE, SUBSCRIBE/NOTIFY, etc., can be used for this purpose. The mechanism needed to notify the old network that Mobile Node 10 is moving, and to inform the old P-CSCF 14 of the new P-CSCF IP address, can be a handover operation (not shown).

In this embodiment, the dependency upon full AKA procedure in order to obtain the SA keys 12 is minimized. Further, in effect, the access control policy will allow the media to flow as soon as Mobile Node 10 sends the packet through the new visited network.

Figure 1:
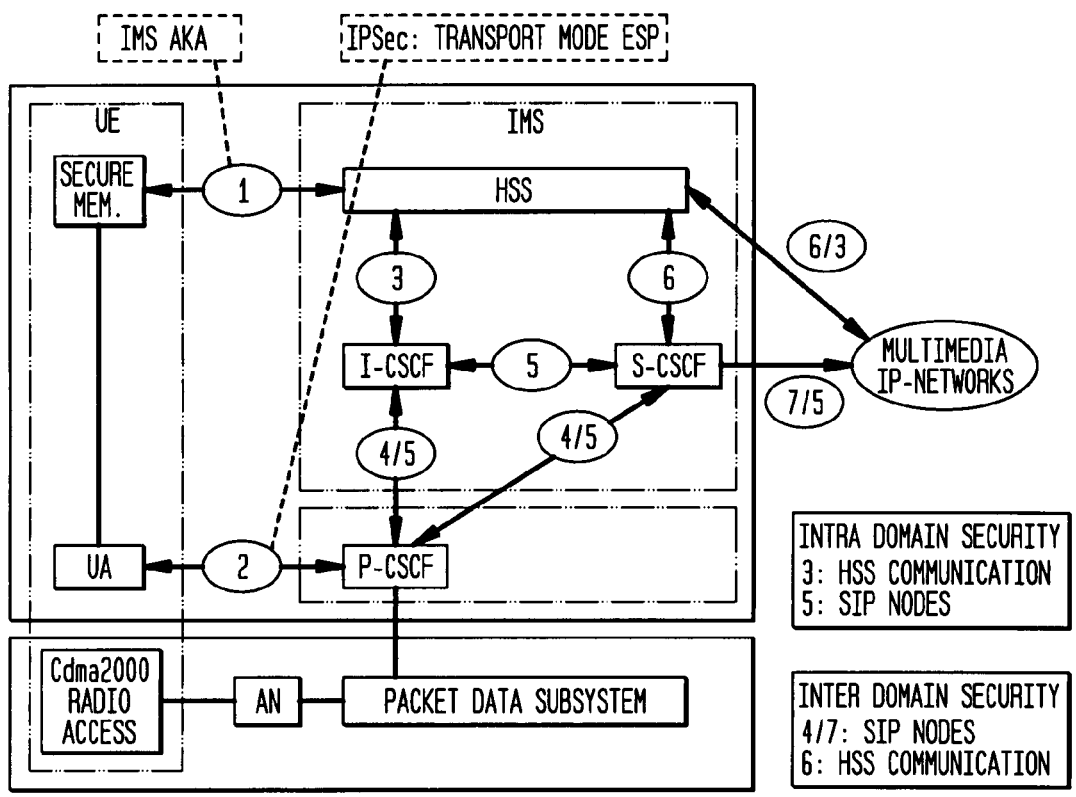
FIG. 1 illustrates an IMS Security Architecture.
Figure 2:
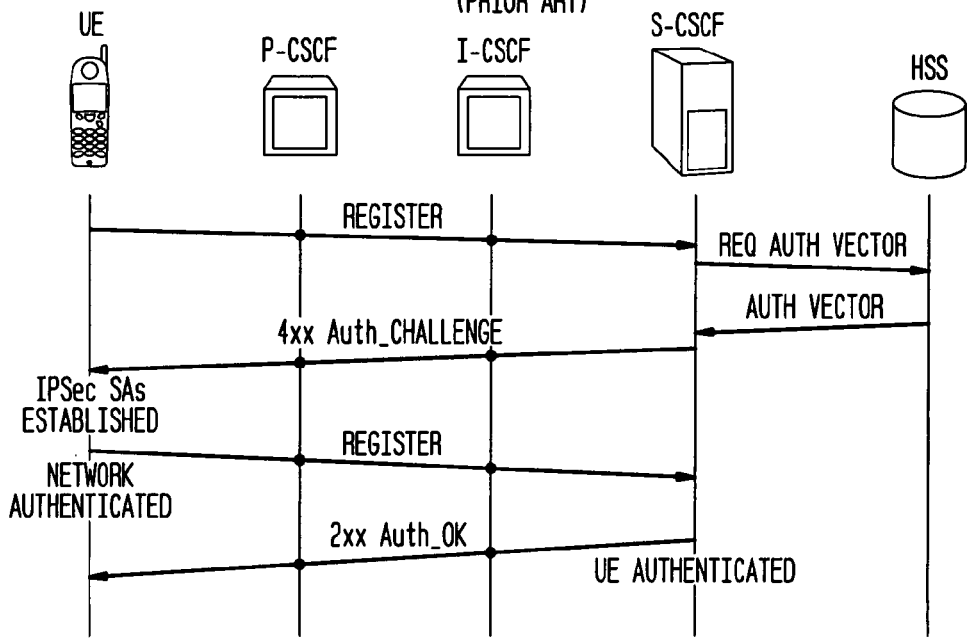
FIG. 2 illustrates IMS AKA Message Flow.
Figure 3:
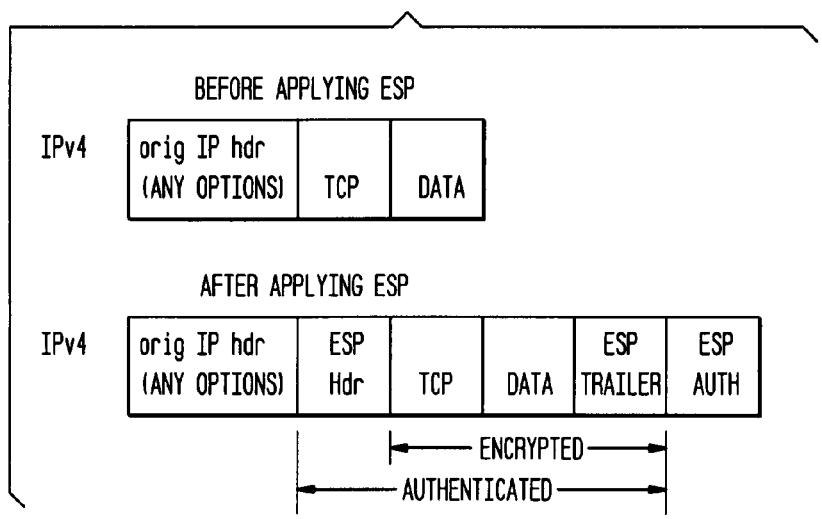
FIG. 3 illustrates ESP in Transport Mode.
Figure 4:
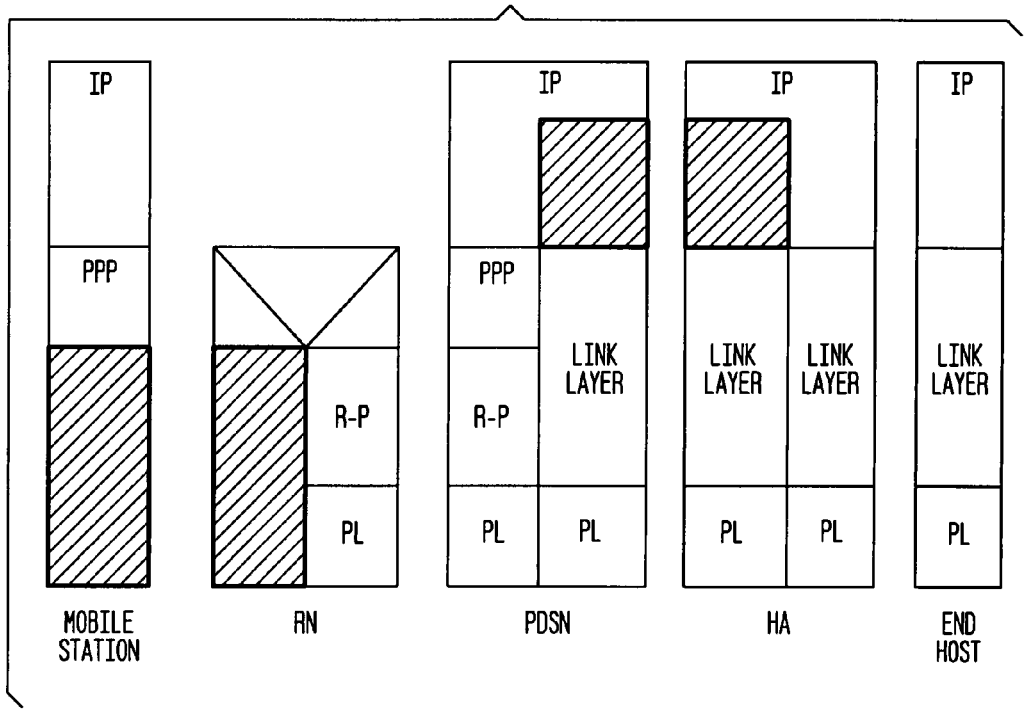
FIG. 4 illustrates User Data Security.
Figure 5:
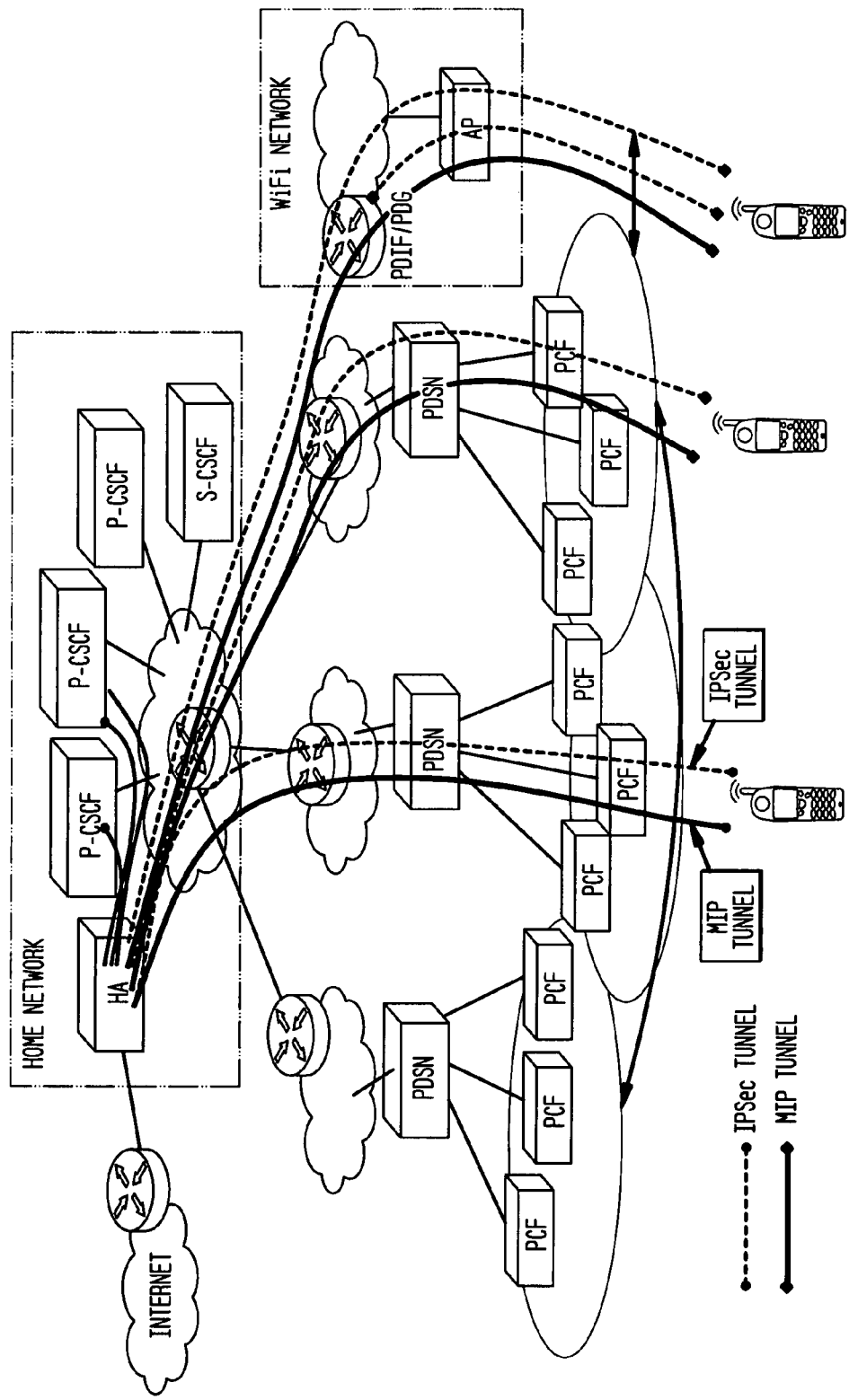
FIG. 5 illustrates Required Tunnels where all P-CSCFs are in a Home Network (MIPv6 protocol)
Figure 6:
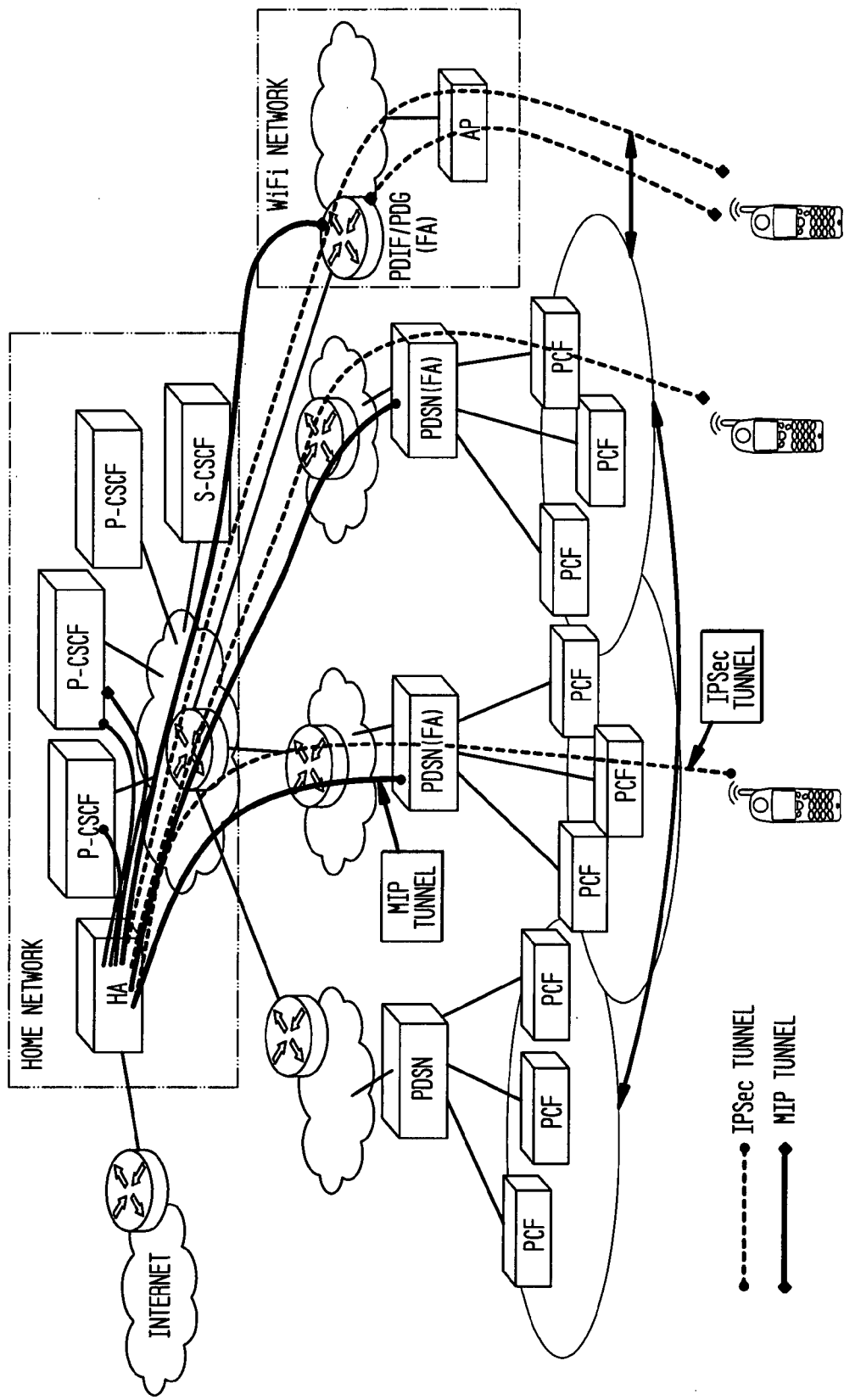
FIG. 6 illustrates Required Tunnels where all P-CSCFs are in a Home Network (MIPv4 protocol)
Figure 7:
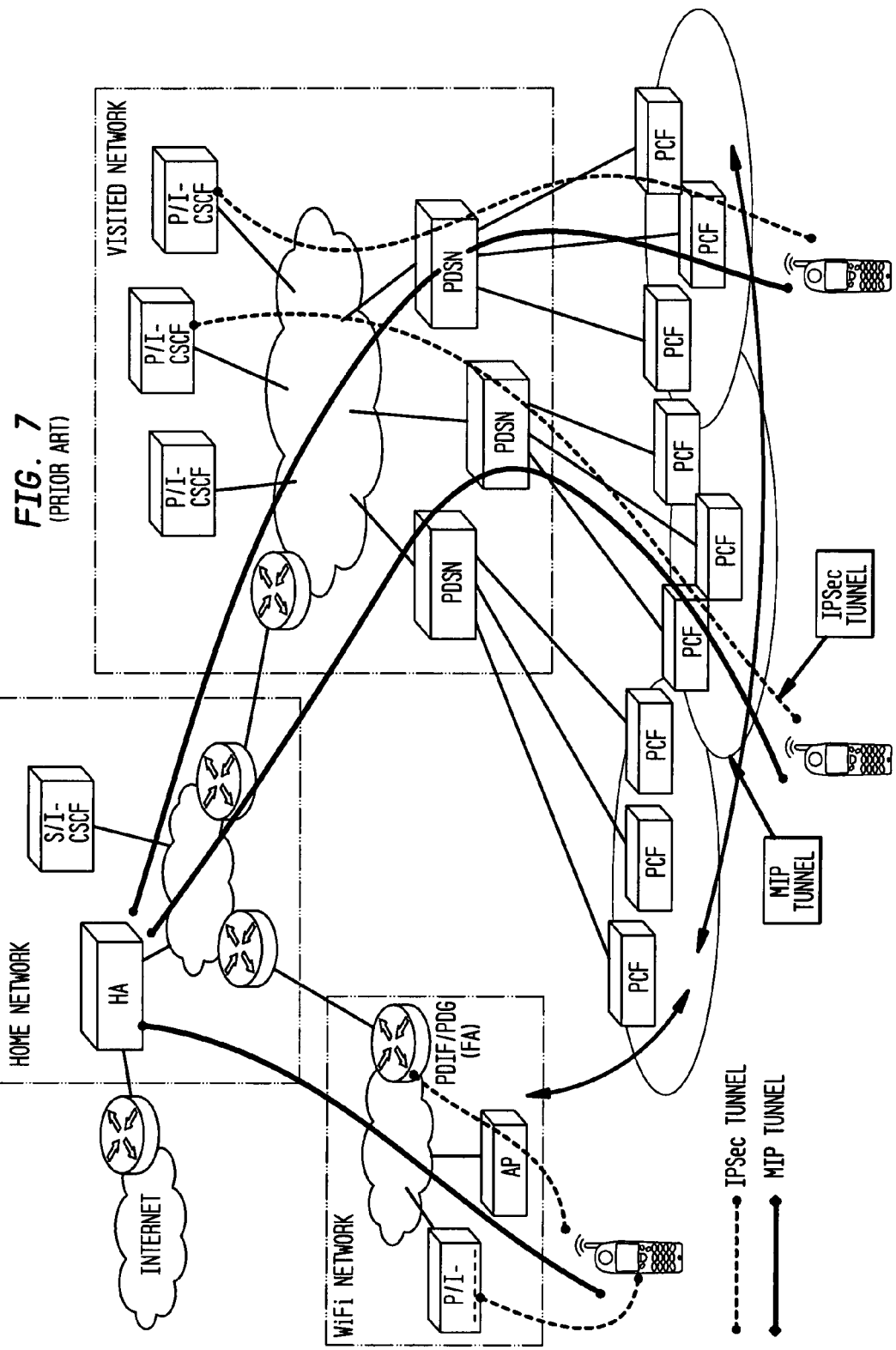
FIG. 7 illustrates Required Tunnels where all P-CSCFs are in a Visited Network (MIPv6 protocol)
Figure 8:
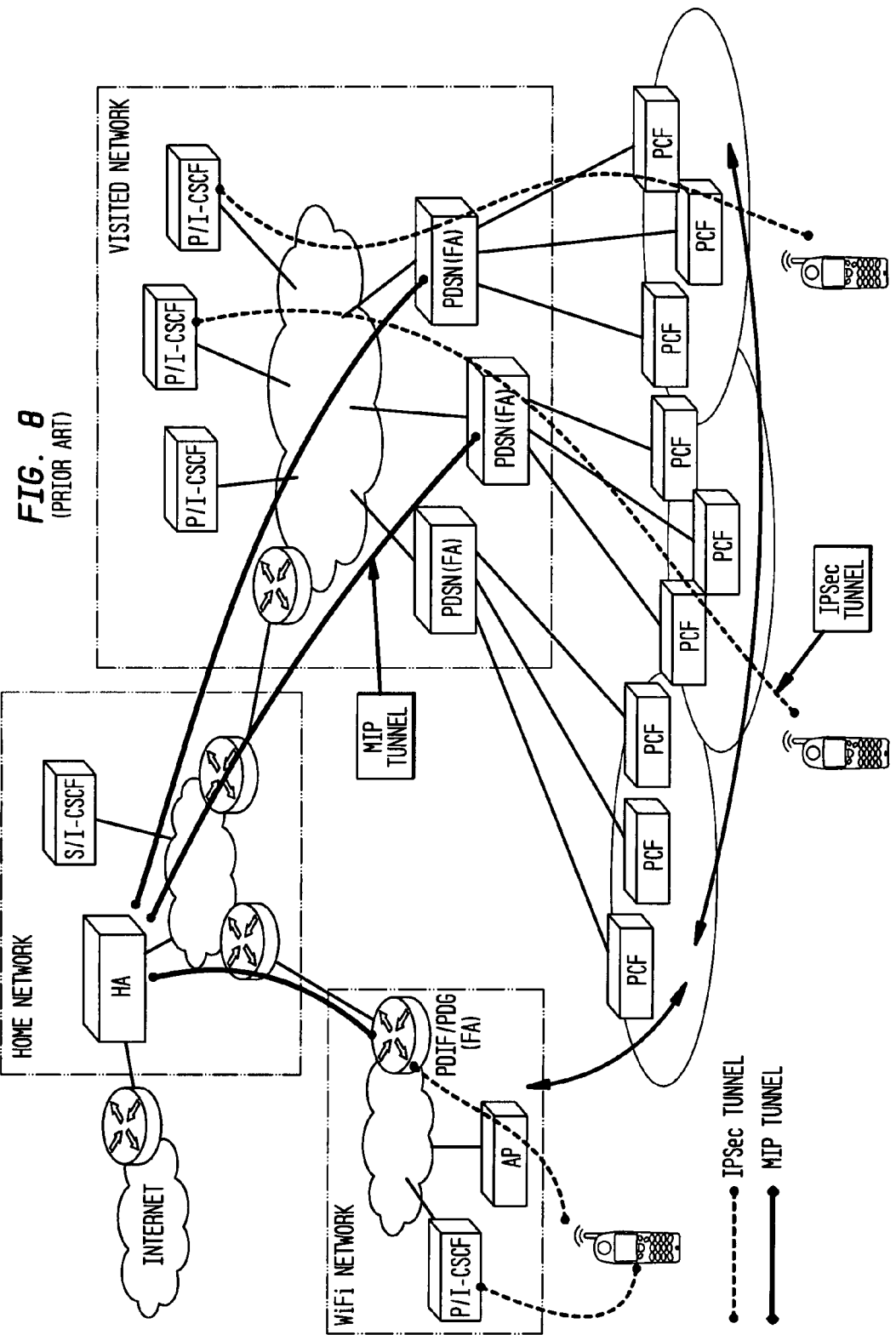
FIG. 8 illustrates Required Tunnels where all P-CSCFs are in a Visited Network (MIPv4 protocol)
Figure 9:
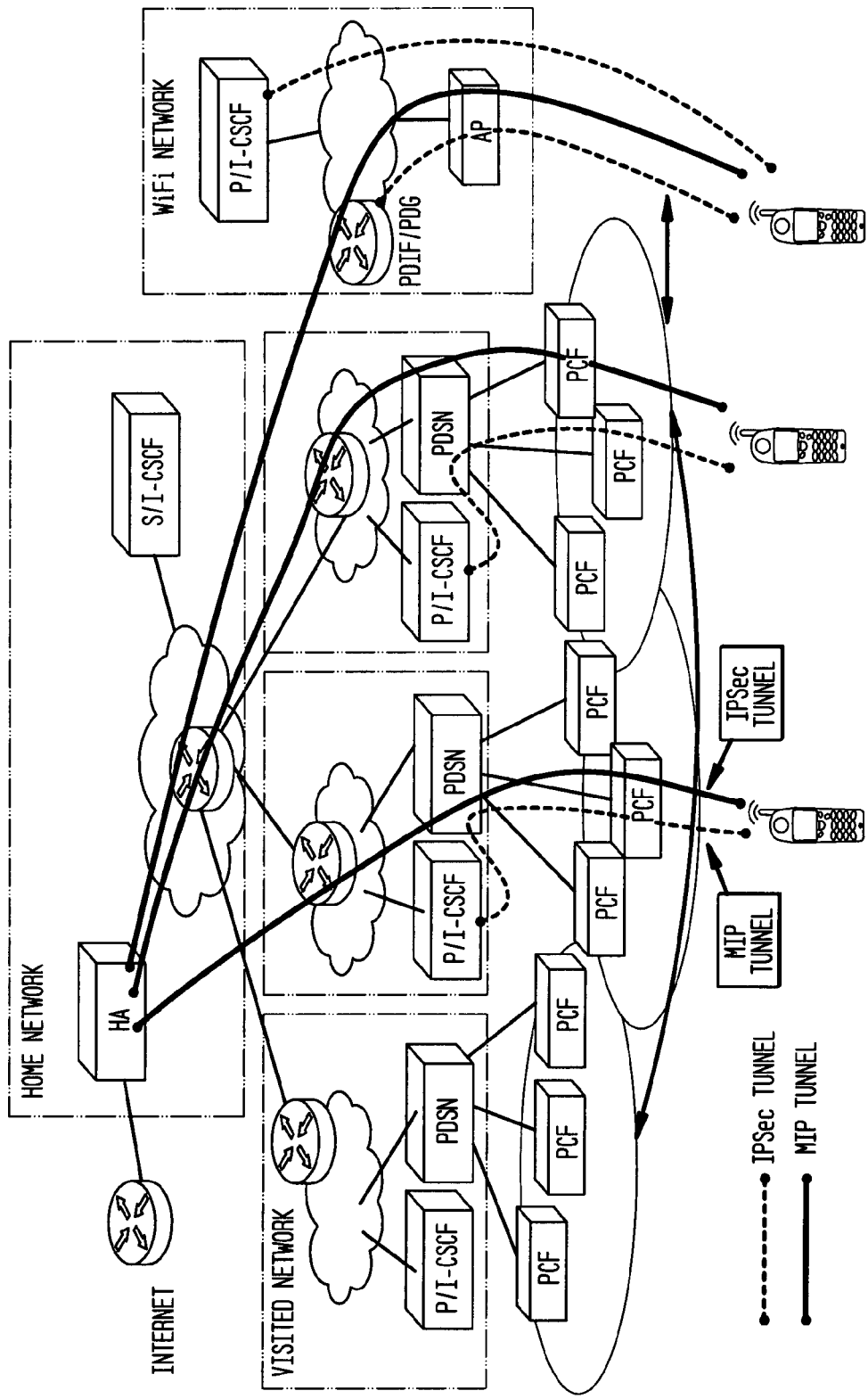
FIG. 9 illustrates Required Tunnels where a P-CSCF is in each subnet (MIPv6 protocol)
Figure 10:
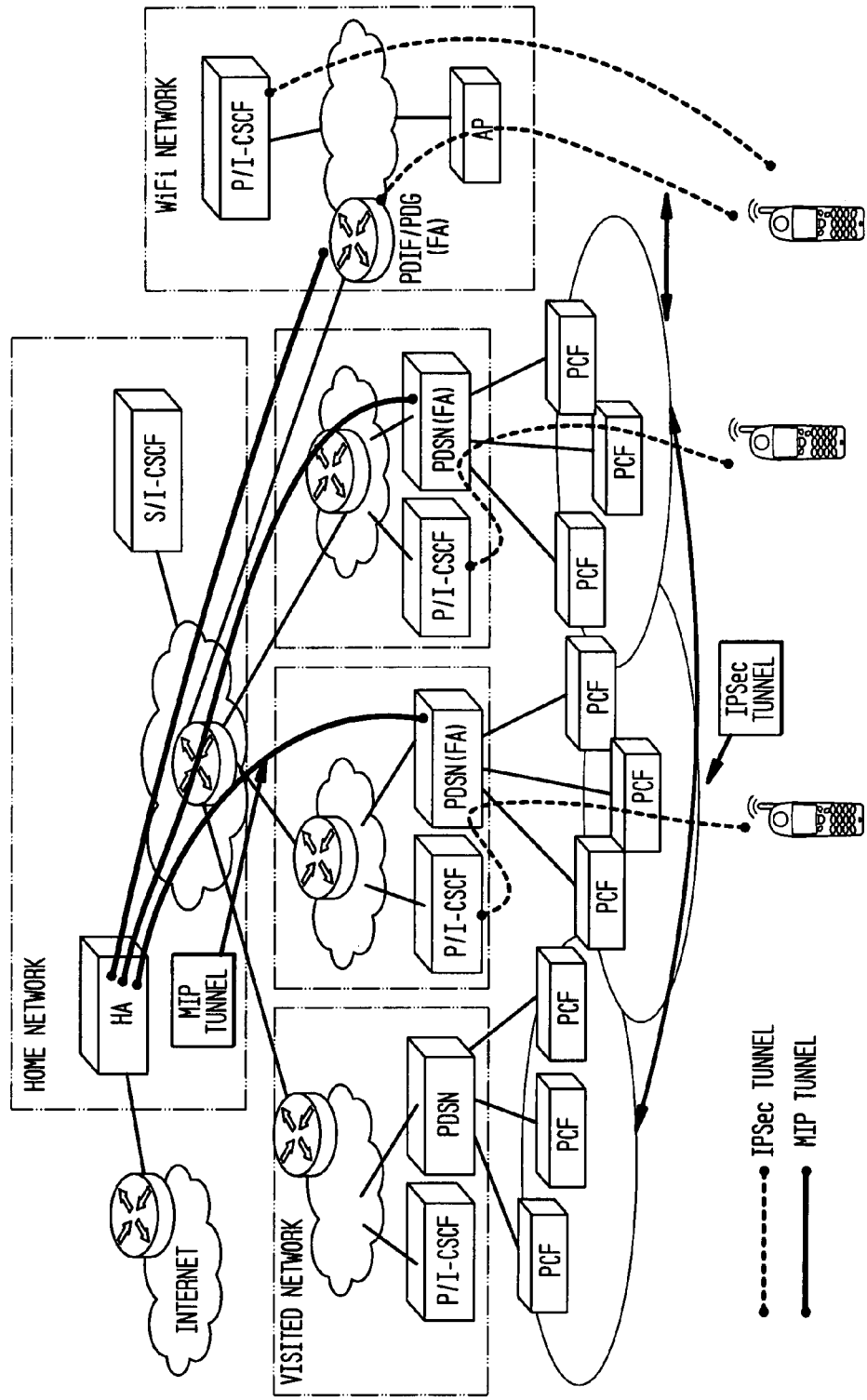
FIG. 10 illustrates Required Tunnels where a P-CSCF is in each subnet (MIPv4 protocol)
Figure 11:
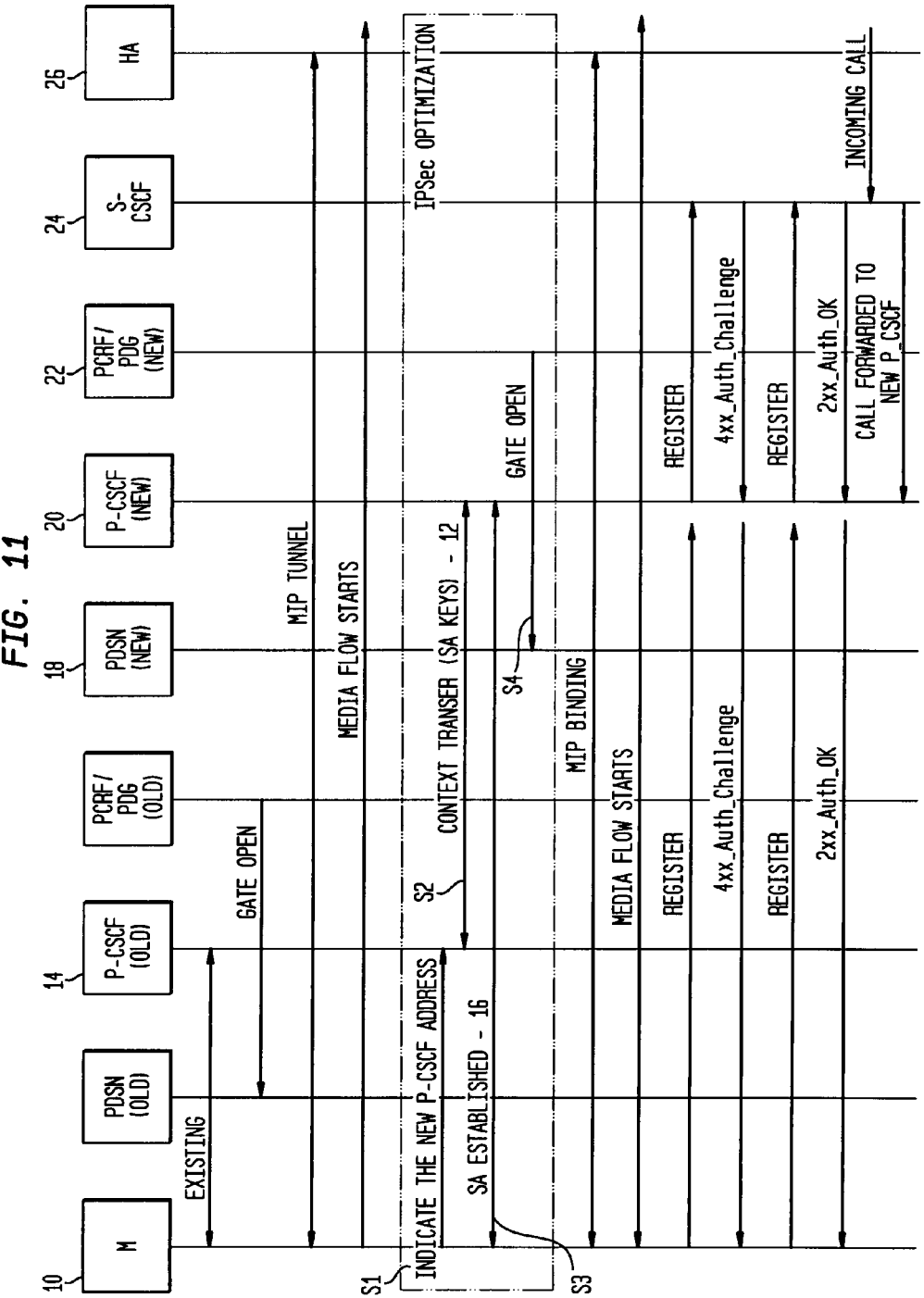
FIG. 11 illustrates Optimization IPSec Call Flows (Keys Transferred by P-CSCF)

FIG. 11 presents the call flows for optimizing IPSec for the embodiment where IPSec SA keys 12 are transferred from old P-CSCF 14 to new P-CSCF 20. The portion of the diagram within the dotted lines contains the sequence of steps that are required for optimization. As illustrated, the optimization steps are as follows. In Step S1, the new P-CSCF 20 is determined and indicated between Mobile Node 10 and old P-CSCF 14. In Step S2, the SA keys 12 are context transferred between old P-CSCF 14 and new P-CSCF 20. The SA is established 16 in Step S3 between Mobile Node 10 and new P-CSCF 20. Finally, in Step S4, the gate or update port between the new PDSN 18 and the new Policy Control Rules Function/Packet Data Gateway (PCRF/PDG) 22 port is open.

The message exchanges can happen both during proactive and reactive handover time. The MIP binding update needs to pass through the gate before the SA is established 16 to avoid the routing loop known as trombone routing. Therefore it is assumed that the new PDSN 18 will keep SIP initial registration and MIP binding update ports always open, as illustrated.

Figure 12:
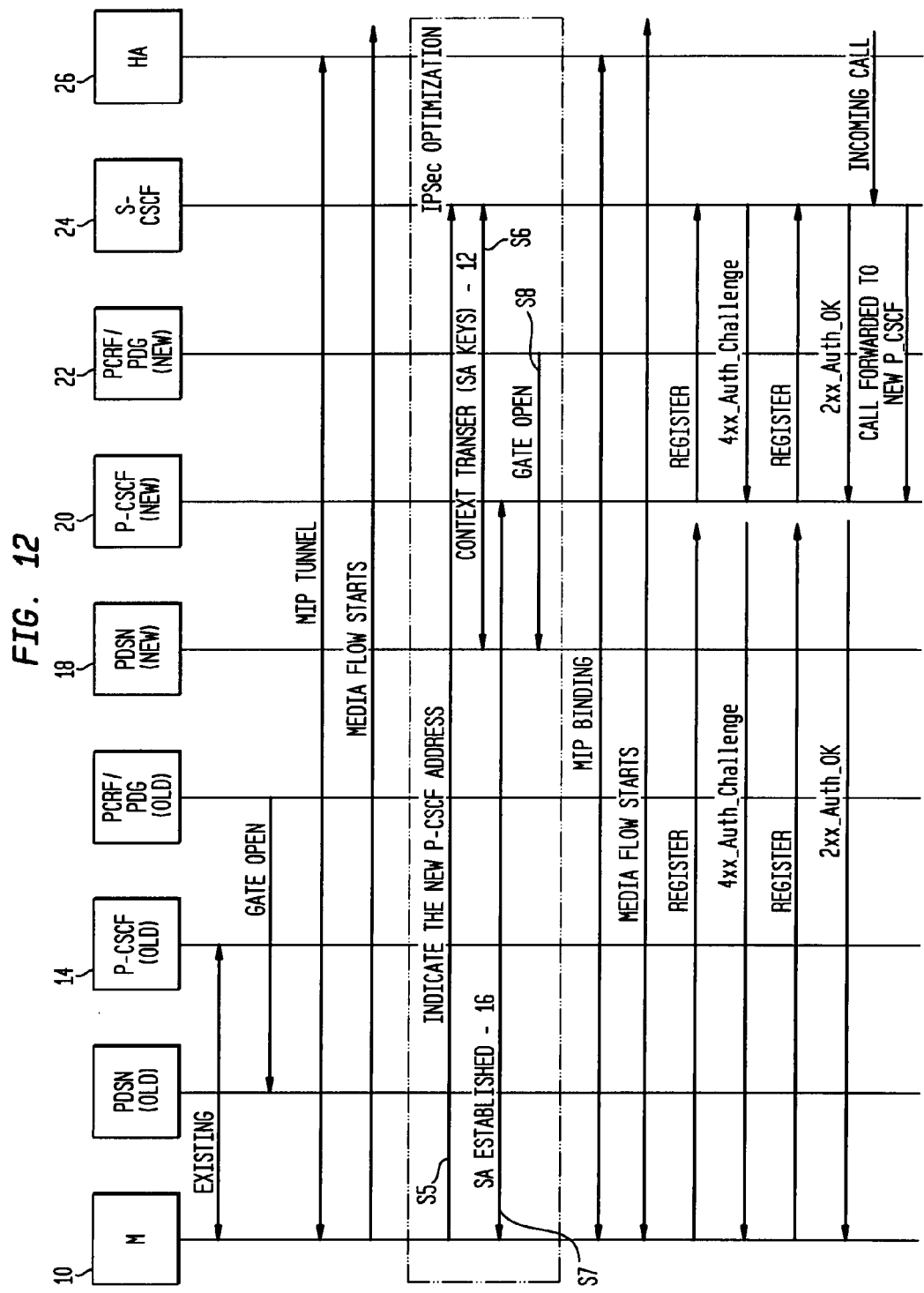
FIG. 12 illustrates Optimization IPSec Call Flows (Keys Transferred by S-CSCF)

In another embodiment, shown in FIG. 12, SA keys 12 are transferred from S-CSCF 24 to new P-CSCF 20. In this case, the SA keys 12 are transferred to the new P-CSCF 20 by S-CSCF 24 through some context transfer mechanism well in advance so that SAs may be established 16 before Mobile Node 10 physically moves to the new subnet. Like the first transferring embodiment, a mechanism, such as a mobility management agent, is needed to notify the S-CSCF 24 that Mobile Node 10 is moving, and to inform the old P-CSCF 14 about new P-CSCF IP address. Again, a handover mechanism (not shown) can provide this functionality.

Once the keys are available, P-CSCF can create the SAs 16 while performing the SIP registration in parallel. Thus the dependency upon full AKA procedure to obtain the SA keys 12 is minimized. Therefore the access control policy will allow the media to flow as soon as Mobile Node 10 sends the packet through the new visited network. As discussed above, several mechanisms such as IETF CXTP, SIP methods such as MESSAGE, SUBSCRIBE/NOTIFY, etc. may be used to transfer keys and other call parameters.

FIG. 12 presents the call flows for optimized IPSec where SA keys 12 are transferred from S-CSCF 24 to new P-CSCF 20. The portion of the diagram within the dotted lines contains the sequence of steps that are required for optimization. As illustrated, the steps in the optimization are as follows. In Step S5, the new P-CSCF 20 is determined and indicated between Mobile Node 10 and S-CSCF 24. In Step S6, the SA keys 12 are context transferred from S-CSCF 24 to new P-CSCF 20. The SA is established 16 in Step S3 between Mobile Node 10 and new P-CSCF 20. Finally, in Step S4, the gate or update port between the new PDSN 18 and the new PCRF/PDG port 22 is open.

As with the first embodiment, these message exchanges can happen both during proactive and reactive handover time. However, proactive handover techniques can help minimizing the delay to a greater extent than reactive handover techniques. As discussed above, MIP binding update and SIP initial registration signaling ports need to be kept open at the new PDSN 18.

Figure 13:
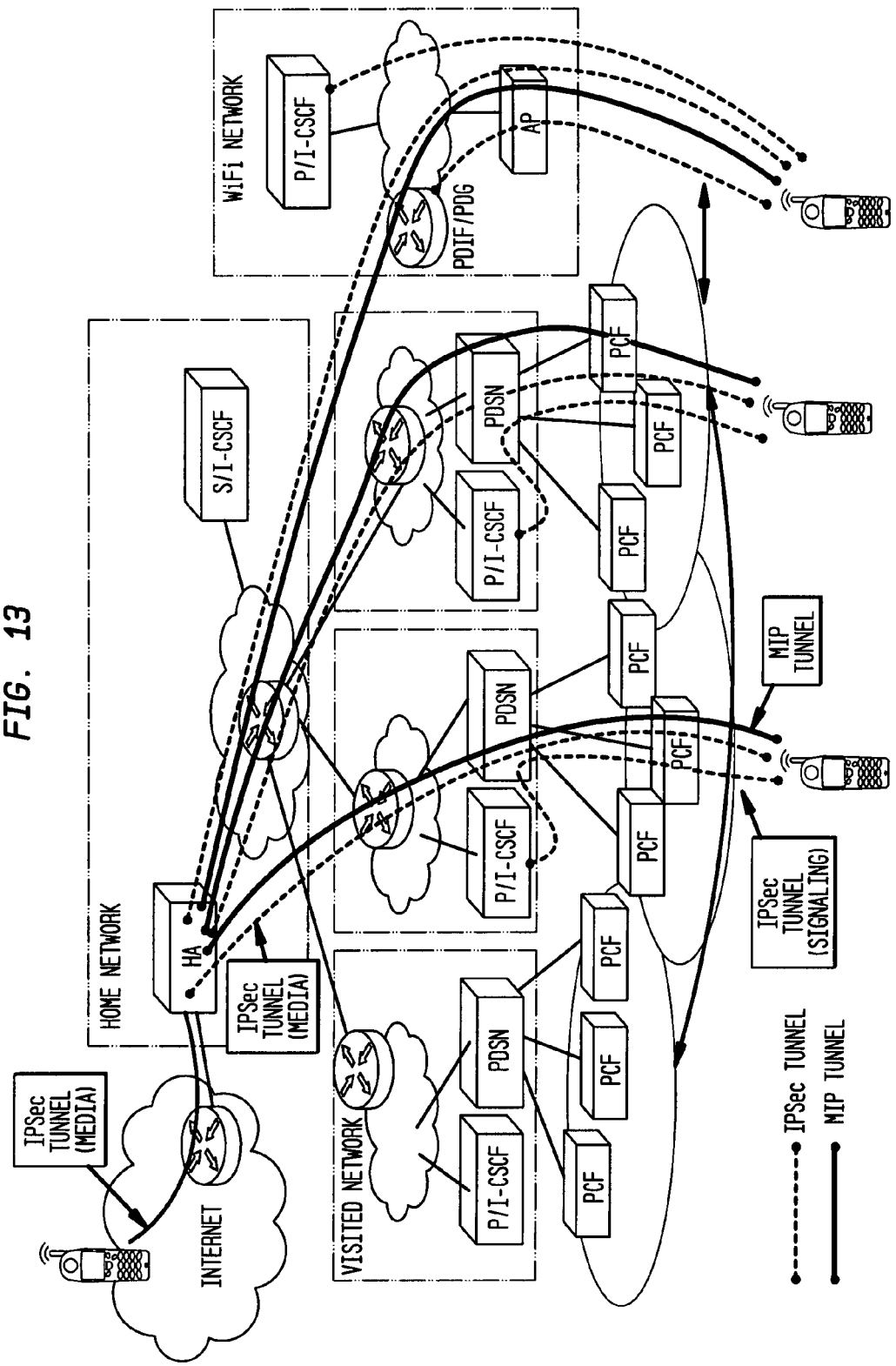
FIG. 13 illustrates Required Number of IPSec Tunnels from MN (for Signaling and Media)

In yet another embodiment, IPSec tunnel overhead, which is an important issue in IMS/MMD architecture, is addressed. FIG. 13 illustrates the number of tunnels that are required where end-to-end security is also provided via IPSec and Mobile Node 10 is using MIPv6 for mobility management. This tunnel overhead is indeed a problem for smaller embedded devices.

Figure 14:
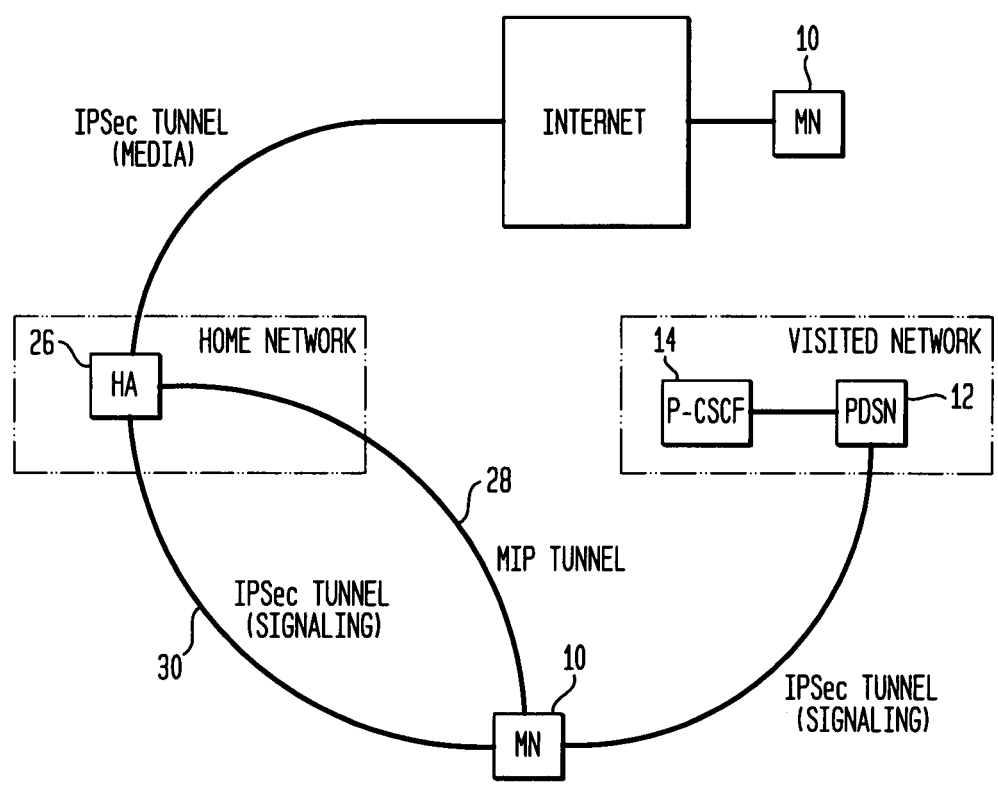
FIG. 14 illustrates MIP and IPSec Tunnels from MN (for Signaling and Media).

In IMS/MMD architecture, in accordance with 3GPP standards, illustrated schematically in FIG. 14, IM-services require a new security association between Mobile Node 10 and the IMS, typically at entity HA 26, before access is granted. Thus the connection, usually a tunnel, between Mobile Node 10 and P-CSCF 14 cannot be relaxed or released, since this connection is protecting the SIP messages between Mobile Node 10 and P-CSCF 14. If the IPSec tunnel 30 is disabled, there are implications such as i) interoperability and non-compliance with the standard, and ii) opening holes for unregistered users to misuse the network resources. On the other hand, 3GPP IMS is discussing relaxing such constraints by providing some alternative mechanisms such as TLS, to secure the signaling. TLS can help mitigate tunnel overhead, and offers an alternative to IPSec to protect the signaling between Mobile Node 10 and P-CSCF 14, particularly for smaller devices having tunnel overhead issues.

For MIPv6, the protocol operation requires establishing an IP-IP tunnel (not shown) at a minimum between Mobile Node 10 and HA 26, and thereby creates routing loops or trombone routing. This tunnel from Mobile Node 10 can be mitigated if PDSN 18 acts as proxy MIPv6 client, like an FA in MIPv4, and creates a tunnel with HA 26 on behalf of Mobile Node 10. This approach may not be feasible in all cases, since it requires PDSN 18 to be on the same layer 2 (L2) link as Mobile Node 10, as shown in FIG. 14. Hence this approach is a non-standard solution with interoperability issues. Another alternative is to use some other mobility mechanism, e.g., SIP, to support seamless mobility.

For end-to-end security, the IPSec tunnel between Mobile Node 10 and HA 26 can be replaced with application layer security mechanisms (not shown) such as TLS, SRTP SMIME, without compromising the media security. In the scenarios where only content security is important, mechanisms such as SRTP or SMIME would be better. Although key management in such cases may be an issue, for current network architecture, this should be manageable if inter provider roaming is not required. Also, if IPSec is used for content security between Mobile Node 10 and HA 26, mobility of IPSec could become an issue depending upon whether SAs are associated with the IP address.

While the present invention has been described in particular embodiments, it should be appreciated that the present invention should not be construed as limited by such embodiments, but rather construed according to the below claims.

What is claimed is:

1. A method for security optimization in an Internet Protocol Multimedia Subsystem/Multimedia Domain (IMS/MMD) architecture for a mobile node in a first network, said mobile node in a mobile device and having a security connection with an old signaling entity associated with said first network, said old signaling entity having keys, said mobile node moving from said first network to a second network, said method comprising the steps of:
   determining, using the mobile device, a new signaling entity associated with said second network while said mobile node is in said first network;
   transferring said keys from said old signaling entity to said new signaling entity while said mobile node is in said first network;
   creating a new security connection between said mobile node and said new signaling entity using said keys when said mobile node moves from said first network to said second network; and
   wherein the old signaling entity is a Proxy Call Session Control Function (P-CSCF) or a Serving Call Session Control Function (S-CSCF) in the first network and the new signaling entity is a P-CSCF in the second network, and the method further comprises registering said mobile node from the first network P-CSCF or S-CSCF to the P-CSCF in the second network in parallel with creating the new security connection between the mobile node and the P-CSCF in the second network.

2. The method according to claim 1, wherein said determining step is performed by a predictive handover procedure.

3. The method according to claim 1, wherein said new security connection is a tunnel between the mobile node and a first hop Session Initiation Protocol (SIP) signaling entity P-CSCF.

4. A system for security optimization in an Internet Protocol Multimedia Subsystem/Multimedia Domain (IMS/MMD) architecture for a mobile node in a first network, said mobile node in a mobile device and having a security connection with an old signaling entity associated with said first network, said old signaling entity having keys, said mobile node moving from said first network to a second network, said system comprising:
   a new signaling entity associated with said second network, said new signaling entity determined using the mobile device while said mobile node is in said first network;
   wherein said keys are transferred from said old signaling entity to said new signaling entity, and a new security connection between said mobile node and said new signaling entity is created using said keys while said mobile node is in said first network;
   wherein the old signaling entity is a Proxy Call Session Control Function (P-CSCF) or a Serving Call Session Control Function (S-CSCF) in the first network and the new signaling entity is a P-CSCF in the second network; and
   wherein the mobile node is registered from the first network P-CSCF or S-CSCF to the P-CSCF in the second network in parallel with creating of the new security connection between the mobile node and the P-CSCF in the second network.

5. The system according to claim 4, wherein said new signaling entity is determined by a predictive handover procedure.

6. The system according to claim 4, wherein said new security connection is a tunnel between the mobile node and a first hop SIP Session Initiation Protocol (SIP) signaling entity P-CSCF.

\* \* \* \* \*

UNITED STATES PATENT AND TRADEMARK OFFICE
CERTIFICATE OF CORRECTION

| | | |
|---|---|---|
| PATENT NO. | : 9,025,771 B2 | Page 1 of 1 |
| APPLICATION NO. | : 11/900619 | |
| DATED | : May 5, 2015 | |
| INVENTOR(S) | : Dutta et al. | |

It is certified that error appears in the above-identified patent and that said Letters Patent is hereby corrected as shown below:

IN THE CLAIMS

In Column 13, Line 6, in Claim 6, delete "hop SIP" and insert -- hop --, therefor.

Signed and Sealed this
Sixth Day of October, 2015

Michelle K. Lee
*Director of the United States Patent and Trademark Office*